Sept. 14, 1937.                C. EVANS                    2,093,190
                HIGHWAY WARNING AND SIGNALING DEVICE
                   Filed Feb. 21, 1936      3 Sheets-Sheet 1
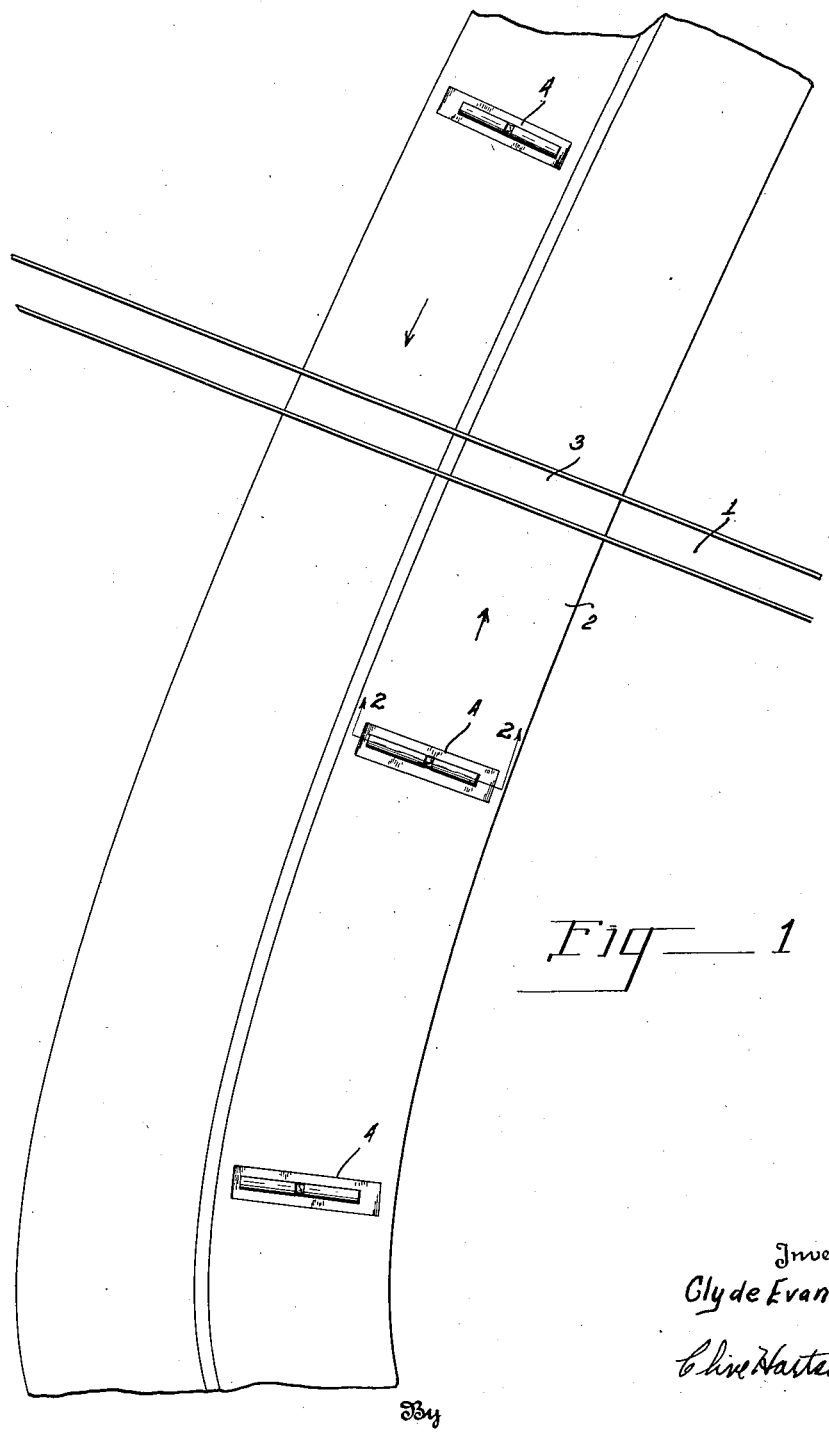
Fig—1
Inventor
Clyde Evans Sept. 14, 1937.   C. EVANS   2,093,190
HIGHWAY WARNING AND SIGNALING DEVICE
Filed Feb. 21, 1936   3 Sheets-Sheet 2
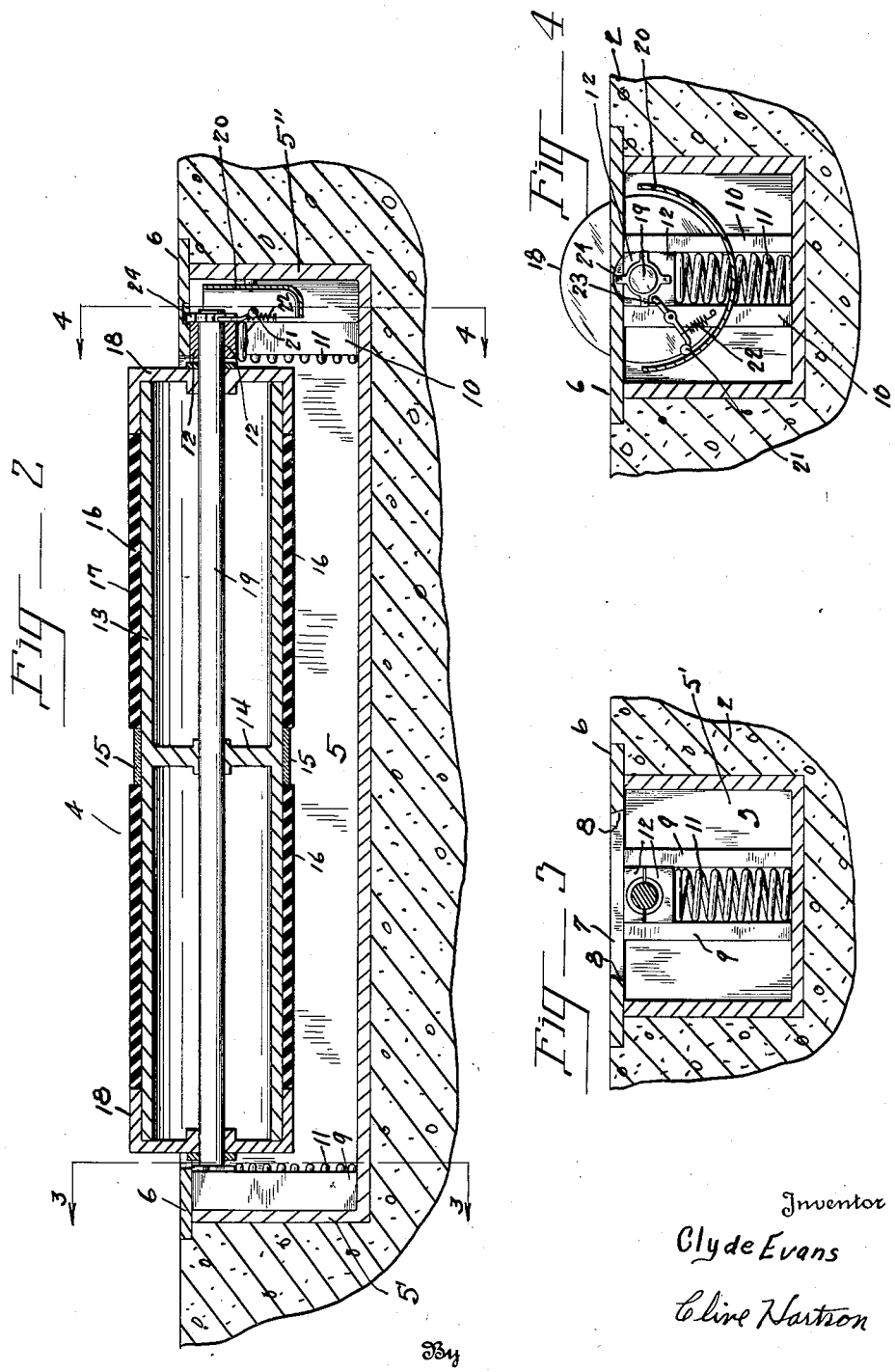
Inventor
Clyde Evans
Clive Hartson
By
Attorney Sept. 14, 1937.   C. EVANS   2,093,190
HIGHWAY WARNING AND SIGNALING DEVICE
Filed Feb. 21, 1936   3 Sheets-Sheet 3
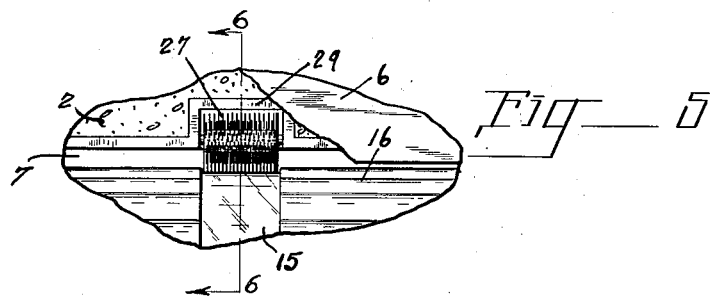
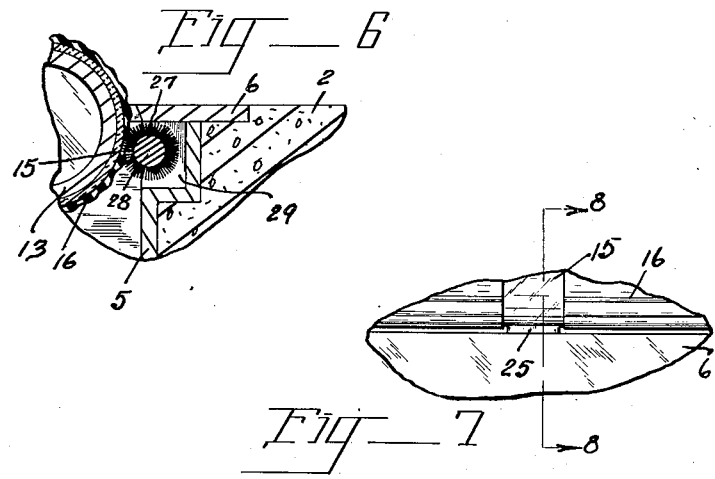
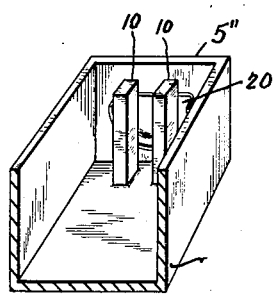
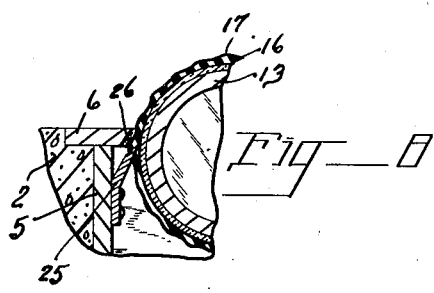
Inventor
Clyde Evans
Clive Hartson
By
Attorney Patented Sept. 14, 1937

2,093,190

UNITED STATES PATENT OFFICE 2,093,190

HIGHWAY WARNING AND SIGNALING DEVICE

Clyde Evans, Portland, Oreg.

Application February 21, 1936, Serial No. 65,124

7 Claims. (Cl. 116—67)

My invention relates to warning devices for highways and the like, and particularly relates to a warning device to be installed upon highways at railroad grade crossings, the particular object of the invention in this instance being to warn the driver and/or riders of a vehicle that they are approaching a danger region—a railroad grade crossing.

Among other objects of my invention, one object is to provide a warning device which will jolt or jar a vehicle coming into contact therewith, and consequently the driver and passengers thereof, in a manner which will not endanger the vehicle or its occupants, but on the other hand will be sufficiently severe to warn such passengers or occupants that they are approaching a danger region.

Another object of my invention is to provide a warning creative device in the path of vehicles approaching danger regions which will transmit a moderate shock to such vehicle to warn the driver and occupants thereof of the approach to a danger region, and which will also operate a suitable audible warning device in conjunction with such shock.

The object of my invention is to arrange these warning devices either in groups, or in spaced relationship, or in any other suitable manner wherein more than one of said devices is employed, and to have such particular arrangement at all times denote to occupants of vehicles that they are approaching a region of more than ordinary danger.

The object of my invention is to provide a warning device of this type which is of simple and inexpensive construction, and one having a low maintenance cost.

The object of the invention is to provide a warning device of this type which may be easily installed, and one which does not require the tearing up of large areas of highway or roadway during such installation.

These and incidental objects of the invention will be seen and understood upon reading the specification following, aided by the several views of the invention in the accompanying drawings, wherein Figure 1 is a plan view, partially diagrammatic, of a railroad and highway grade crossing. Figure 2 is a horizontal sectional view of the invention taken upon the section line 2—2 in Figure 1. Figure 3 is the sectional view indicated by section line 3—3 in Figure 2. Figure 4 is the sectional view indicated by section line 4—4 in Figure 2. Figure 5 is a fragmentary plan view of the midsection of the invention with parts broken away to disclose the brush for cleaning the reflector plate. Figure 6 is the sectional view indicated by section line 6—6 in Figure 5. This view further illustrates the brush for cleaning the reflector plate. Figure 7 is a fragmentary plan view of the midsection illustrating the scraping member for scraping dirt and refuse from the reflector plate. Figure 8 is the sectional view indicated by section line 8—8 in Figure 7. Figure 9 is a perspective in section of one end of the drum casing. This view shows the spring guides and the warning gong.

In the drawings similar characters refer to similar parts throughout the several views.

Referring to the drawings, the numeral 1 indicates a railroad track while the numeral 2 indicates a highway crossing such railroad track at the same grade as indicated by numeral 3. The highway is provided with opposite lanes of travel as indicated by the arrows. In each lane there is placed one or more of my danger signaling devices, which are indicated by the numerals 4. These devices are embedded in the highway and extend transversely of each lane as it approaches crossing 3.

Referring now to Figure 2 and related figures, the warning device is seen to embody an elongated casing 5 embedded in the highway 2 and provided with a top plate 6, the upper surface of which is flush with the surface of the highway. The plate has a longitudinal opening or slot 7 having inclined walls 8. In the end 5' of the casing there are a pair of upright spring and bearing guides 9. These extend in parallel spaced relationship with each other from the bottom of the casing to the plate 6. At the opposite end 5'' there is another pair of upright spring and bearing guides 10. These are parallel and spaced apart and from end 5'' and also extend from the bottom of the casing to plate 6. Seating between guides 9 and guides 10 are the coil springs 11, and seated upon these springs are the bearing blocks 12.

There is associated with the elements just described, a cylinder or drum 13 having an intermediate inner web 14. Intermediate the ends of the drum and embracing it is a reflecting member 15 which may be formed of suitable colored glass. At each side of member 15, but spaced somewhat from the ends of the drum are the yieldable faces 16, preferably formed of rubber secured to the outer surface of the drum. These faces have an outer longitudinally corrugated or otherwise roughened surface. At each end of the drum is a cap 18 which is rigidly secured to such member. Extending through caps 18 and web 14 and rigid therewith and forming the axis of the drum is a shaft 19. The ends of the shaft are journaled in the bearing blocks 12. Thus it will be seen that drum 13 is seated in casing 5 with a portion thereof projecting through slot 7 and extending above the surface of highway 2.

Mounted to end 5'' of casing 5 is gong 20 which has a clapper or tongue 21 pivoted to guide 10. Clapper 21 is urged to strike the gong by the spring 22. An arm 23 of the clapper extends in the line of movement of the trippers 24 on shaft 19. When drum 13 rotates counter-clockwise, the trippers will one after another engage arm 23 causing it to move away from the gong and extend spring 22. As the engaging tripper continues to rotate it disengages the arm permitting spring 22 to contract and pull the clapper in the opposite direction and strike the gong 20 thereby creating an audible signal.

In order to remove dirt and mud from the reflecting member 15, I have provided on one side of the casing and in juxtaposition to such member a scraper 25 having a beveled edge 26 which scrapes and removes adhering mud and foreign matter. On the opposite side I have provided a brush 27 on a spindle 28 seated in an offset 29 of casing 5. This brush sweeps dust and dirt adhering to member 15 and other foreign matter not requiring the services of scraper 25.

In operation the invention is embedded in the highway as shown in Figures 1 and 2 with a portion of the drum protruding through slot 7. The drum extends transversely to the traffic lane, and consequently is in position to be engaged by the wheels of a passing vehicle. As the wheels come into contact with drum 13 it transmits a slight jar to the vehicle and its occupants at the same time preventing an extreme or dangerous jar by receding somewhat into the casing upon the springs 11 which springs to a large extent act as shock absorbers. As the vehicle wheels pass over the drum, their rotation is transmitted to the drum causing it to rotate, thus causing the trippers 24 to engage arm 23 of clapper 21 thereby causing such clapper to operate and strike gong 20 as heretofore explained. The striking of the gong produces an audible signal thus providing an additional warning.

In Figure 1 I have shown my invention arranged in multiple, with one spaced from the other and both spaced from a danger region. It is my intention to employ a fixed number of these devices in connection with a specific danger region. For instance, as shown in drawings, I may elect to employ two in each traffic lane on approaches to a railroad grade crossing. One can be spaced one hundred feet from the crossing and the other two hundred, though other suitable spacing may be employed. Thus when vehicles engage two of my warning devices their occupants will understand that they are approaching a railroad grade crossing. They will have sufficient warning and can then take proper precautions. While I am particularly concerned about the danger of railroad grade crossings, I wish it to be particularly understood that my invention is not limited thereto, as it is apparent that it is capable of being employed as a warning device for other danger regions.

While a specific form of the improvement has been described and illustrated herein, it is desired to be understood that the same may be varied, within the scope of the appended claims, without departing from the spirit of the invention.

Having described my invention, I claim:—

1. A highway warning and signaling device, comprising a casing embedded in the highway and having an elongated slot extending transversely thereof, a drum having a corrugated outer yieldable surface mounted upon a vertically yieldable axis and partially protruding through the slot, said drum having an intermediate encircling light reflecting element, said drum yielding to and being rotated by wheels of passing vehicles, and an audible warning device operated by the rotative movement of the drum.

2. A highway warning and signaling device, comprising a casing embedded in the highway and having an elongated slot extending transversely of such highway, a drum and its axial shaft, vertically yieldable bearing blocks journalling the ends of the shaft, said drum protruding partially from such slot and yielding to and being rotated by wheels of passing vehicles, and an audible warning device operated by the drum when rotated.

3. A highway warning and signaling device, comprising a drum rotatively mounted within a recess in and extending transversely of a highway, a yieldable axial support for said drum, said drum protruding above the surface of the highway and yielding to and being rotated by wheels of passing vehicles, and a warning device operated by the rotative movement of the drum.

4. A highway warning and signaling device, comprising a drum rotatively mounted within a recess extending transversely in a highway, a yieldable axial support for said drum, said drum protruding slightly above the surface of the highway and yielding to and being rotated by wheels of passing vehicles, a warning device operated by the rotative movement of the drum, and a reflecting element encircling the drum for reflecting the light rays emanating from the head lamps of approaching vehicles.

5. A highway warning and signaling device, comprising a drum rotatively mounted within a recess extending transversely in a highway, said drum protruding partially above the surface of the highway and being rotated by wheels of passing vehicles, a warning device operated by the drum when rotated, and a brush mounted below the surface of the highway for cleaning a section of the outer surface of the drum as it rotates.

6. A highway warning and signaling device, comprising a drum rotatively mounted within a recess extending transversely in a highway, said drum protruding partially above the surface of the highway and being rotated by wheels of passing vehicles, a warning device operated by the drum when rotated, and a scraping device for scraping substances adhering to the outer surface of the drum as it rotates.

7. A highway warning and signaling device, comprising a casing embedded in a highway and having an elongated slot opening out thereof and extending transversely of such highway, a pair of spaced bearing guides mounted in each end of the casing, a coil spring mounted between each pair of guides, a bearing block seated upon each spring, a drum having a corrugated, yieldable exterior surface each side of a centrally positioned reflecting member, a shaft supporting the drum and having its ends journaled within the bearing blocks, said drum having a portion extending through the slot and above the surface of the highway and yielding to and turning with the wheels of passing vehicles, a gong mounted within the casing at one end of the drum, a clapper for sounding the gong, and a tripper mounted upon the shaft operating the clapper when the drum is rotated.

CLYDE EVANS.